(12) United States Patent  
Horng (10) Patent No.: US 8,349,433 B2  
(45) Date of Patent: Jan. 8, 2013

(54) MULTI-LAYER PLATE MEMBER BONDING STRUCTURE

(76) Inventor: Chin-Hsing Horng, Kueishan Hsiang (TW)

( * ) Notice: Subject to any disclaimer, the term of this patent is extended or adjusted under 35 U.S.C. 154(b) by 45 days.

(21) Appl. No.: 12/906,120

(22) Filed: Oct. 17, 2010

(65) Prior Publication Data

US 2012/0094080 A1     Apr. 19, 2012

(51) Int. Cl.
*B32B 3/10* (2006.01)
(52) U.S. Cl. .................. 428/133; 428/100; 428/172
(58) Field of Classification Search .............. 428/99, 428/100, 119, 131, 133, 132, 134, 223, 137, 428/457, 596, 597, 156, 172; 52/673, 671, 52/675; 361/679.01, 679.02; 403/265–269
See application file for complete search history.

(56) References Cited

U.S. PATENT DOCUMENTS 4,352,381 A * 10/1982 Provi .......................... 30/308.1
2010/0084227 A1 * 4/2010 Lin et al. .................... 188/73.37

* cited by examiner

*Primary Examiner* — Maria Veronica Ewald
*Assistant Examiner* — Megha Mehta (57) ABSTRACT

A multi-layer plate member bonding structure includes a first plate member having a binding unit protruded from the top surface thereof, a second plate member having one open chamber cut through opposing outer face and bonding face thereof corresponding to the binding unit of the first plate member, and an adhesive filled up the open chamber and cured to form a first stop portion in the relatively greater upper part of the open chamber and a second stop portion in the relatively smaller lower part of the open chamber to secure the first plate member and the second plate member firmly together.

5 Claims, 10 Drawing Sheets

MULTI-LAYER PLATE MEMBER BONDING STRUCTURE

BACKGROUND OF THE INVENTION

1. Field of the Invention

The present invention relates to plate member bonding technology and more particularly, to a multi-layer plate member bonding structure, which enables multiple plate members to be joined together positively.

2. Description of the Related Art

Following fast development of science and technology, the design concept of commercial electronic products is focused on light, thin, short and small characteristics. Many electronic products (cell phone, notebook, PDA, etc.) are made convenient to carry by user. To enhance mobility, the weight of electronic products must be reduced. In order to reduce the weight, the shell or casing of an electronic product may be formed of an outer metal layer having a relatively thinner wall thickness and an inner plastic layer having a relatively thicker wall thickness. This design greatly reduces the product weight while providing excellent tensile strength. Further, the outer metal layer facilitates surface treatment by an electroplating or coating technique. Therefore, metal is commonly used for the casing or the outer layer of the casing for commercial electronic products.

When setting a plastic plate member in a metal plate member to give a support, an adhesive is usually used to bond the two plate members together. However, this method has drawbacks as follows:

1. After hardened, the volume of the adhesive is slightly reduced (due to vaporization of fluid), and tiny open spaces may exist in between the metal plate member and the plastic plate member, lowering the product yield rate.

2. The metal plate member and the plastic plate member may be twisted when the user opens or closes the electronic product, and the torsional force thus produced may cause separation of the adhesive from the metal plate member and/or the plastic plate member, resulting in plate member separation damage.

3. When bonding the metal plate member and the plastic plate member together, the hardening time of the applied adhesive prolongs the product manufacturing time. Further, the use of the adhesive relatively increases the manufacturing cost of the product, weakening the competitive advantage.

SUMMARY OF THE INVENTION

The present invention has been accomplished under the circumstances in view. It is the main object of the present invention to provide a multi-layer plate member bonding structure, which enables two plate members, either of the same material or different materials, to be bonded together firmly.

To achieve these and other objects of the present invention, a multi-layer plate member bonding structure comprises a first plate member having at least one binding unit protruded from a top surface thereof; a second plate member comprising an outer face disposed at one side thereof, a bonding face disposed at an opposite side thereof and attached to the top surface of the first plate member, at least one open chamber cut through the outer face and the bonding face corresponding to the at least one binding unit of the first plate member, each open chamber having a relatively greater upper part connected to the outer face and a relatively smaller lower part connected to the bonding face; and an adhesive filled up each open chamber and cured, the adhesive forming a first stop portion in the relatively greater upper part of each open chamber and a second stop portion in the relatively smaller lower part in each open chamber to secure the first plate member and the second plate member firmly together. Further, the adhesive can be a polymer material. Further, each binding unit comprises a plurality of binding strips. Each binding strip has one end thereof connected to the top surface of the first plate member and an opposite end thereof obliquely extending in direction away from the top surface of the first plate member. Further, the second stop portion of the adhesive in each open chamber is formed in between the binding strips of the associating binding unit and the top surface of the first plate member.

DETAILED DESCRIPTION OF THE PREFERRED EMBODIMENT

Figure 1:
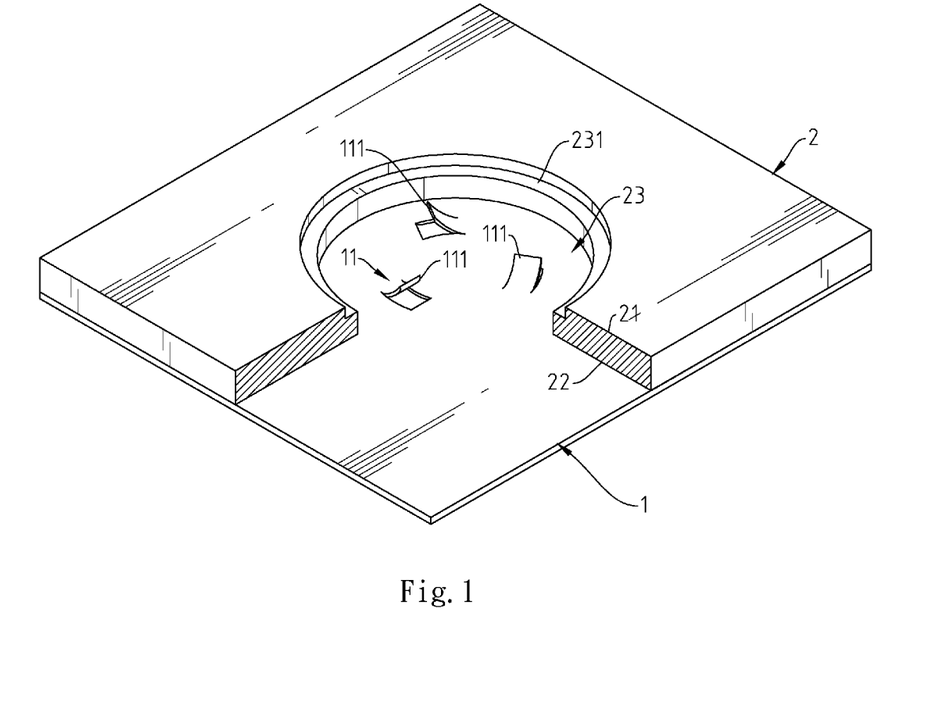
FIG. 1 is a cutaway view of a multi-layer plate member bonding structure in accordance with a first embodiment of the present invention (before application of the adhesive).
Figure 2:
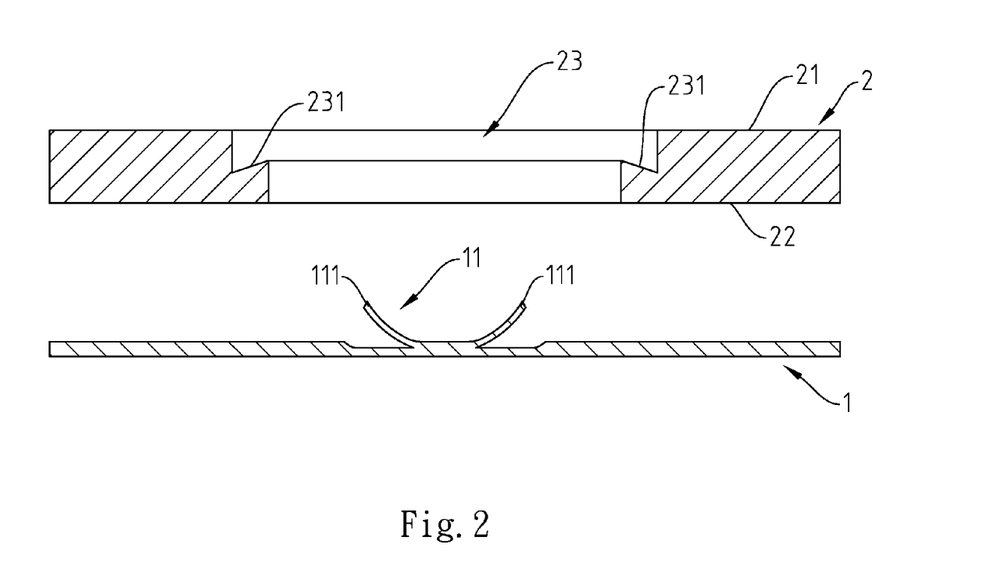
FIG. 2 is an exploded, sectional side view of the multi-layer plate member bonding structure in accordance with the first embodiment of the present invention (before application of the adhesive).
Figure 3:
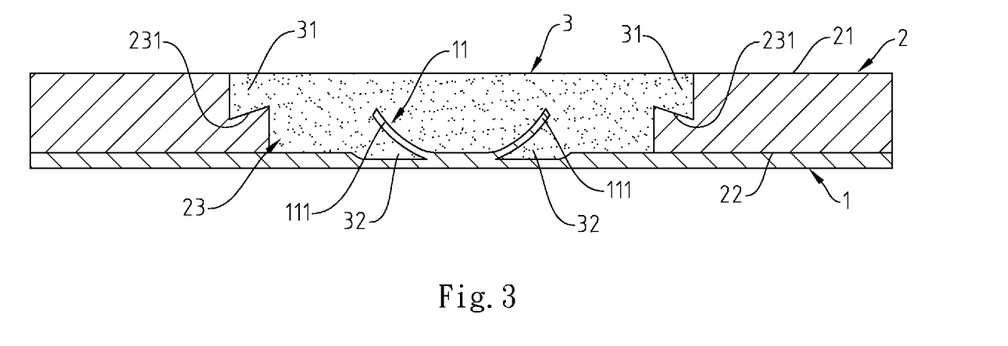
FIG. 3 is a sectional side view of the multi-layer plate member bonding structure in accordance with the first embodiment of the present invention (after bonding).

Referring to FIGS. 1-3, a multi-layer plate member bonding structure in accordance with the present invention is shown comprising a first plate member 1, a second plate member 2 and an adhesive 3.

The first plate member 1 comprises a binding structure 11 located on one side thereof. The binding structure 11 comprises a plurality of binding strips 111 upwardly cursedly extended from the first plate member 11. Each binding strip 111 has its one end connected to the surface of the first plate member 1 and its other end obliquely extending in direction away from the surface of the first plate member 1.

The second plate member 2 comprises opposing outer face 21 and bonding face 22, an open chamber 23 cut through the outer face 21 and the bonding face 22 and made in a stepped form, and an annular step 231 defined in the open chamber 23. The upper part of the cross section of the open chamber 23 that is disposed adjacent to the outer face 21 is relatively greater than the lower part of the cross section of the open chamber 23 that is disposed adjacent to the bonding face 22.

The adhesive 3 is prepared in a fluid condition, and will cure under a particular condition, for example, when exposed to light or heat subject to the material property of the adhesive. The adhesive 3 can be a polymer, for example, thermosetting plastics, thermoplastic plastics, UV curable polymer or the like.

When bonding the first plate member 1 and the second plate member 2 together, attach the second plate member 2 to the surface of the first plate member 1 to keep the bonding face 22 of the second plate member 2 in contact with the surface of the first plate member 1 and let the binding unit 11 of the first plate member 1 be received in the open chamber 23, and then fill up the open chamber 23 with the adhesive 3. When the adhesive 3 is cured, a cured adhesive 3 forms a first stop portion 31 in the open chamber 23 above the annular step 231 and a second stop portion 32 in the open chamber 23 between the surface of the first plate member 1 and the binding strips 111 of the binding unit 11. Because the second stop portion 32 of the cured adhesive 3 is formed in the open chamber 23 between the surface of the first plate member 1 and the binding strips 111 of the binding unit 11, the cured adhesive 3 is tightly secured to the surface of the first plate member 1. Further, because the first stop portion 31 is formed in the open chamber 23 above the annular step 231 where the cross-sectional area is greater than the cross-sectional area of the second stop portion 32, the first stop portion 31 stops the second plate member 2 from an outward displacement in direction away from the first plate member 1, and therefore the second plate member 2 is firmly secured to the first plate member 1.

Figure 4:
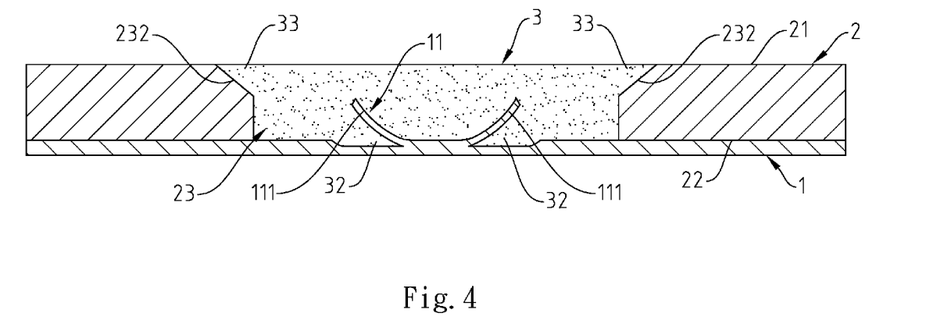
FIG. 4 is a sectional side view of the multi-layer plate member bonding structure in accordance with a second embodiment of the present invention (after bonding).

Referring to FIG. 4, instead of the aforesaid stepped design, the open chamber 23 can be made having a tapered upper part 232 of which the diameter is gradually increased in direction away from the first plate member 1. When the adhesive 3 is cured, the cured adhesive 3 forms a first stop portion 33 in the tapered upper part 232 of the open chamber 23 and a second stop portion 32 in the open chamber 23 between the surface of the first plate member 1 and the binding strips 111 of the binding unit 11, achieving the same effect as that shown in FIGS. 1~3.

Figure 5:
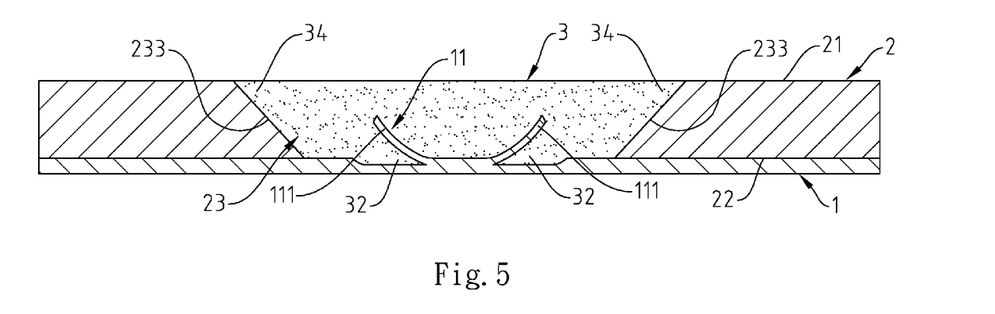
FIG. 5 is a sectional side view of the multi-layer plate member bonding structure in accordance with a third embodiment of the present invention (after bonding).
Figure 6:
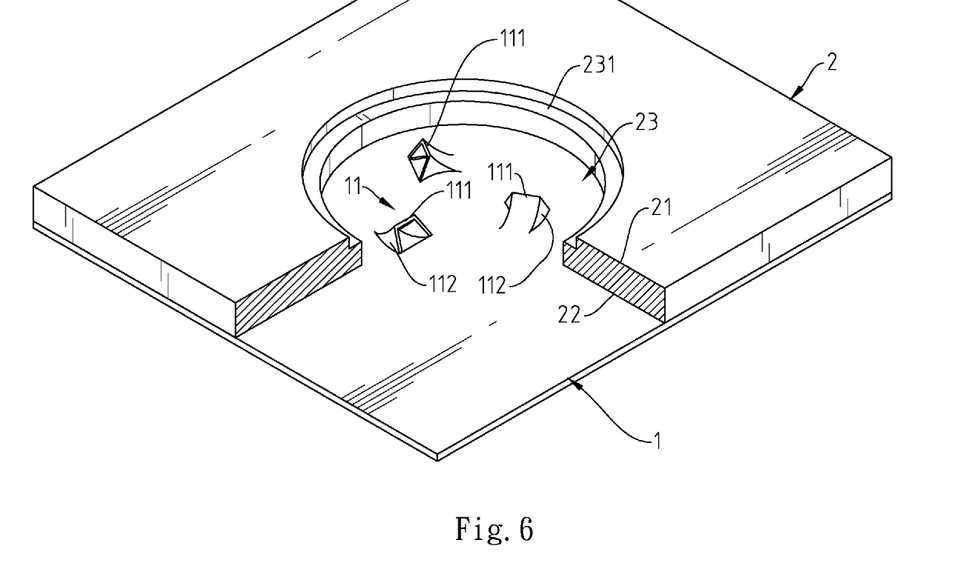
FIG. 6 is a cutaway view of a multi-layer plate member bonding structure in accordance with a fourth embodiment of the present invention (before application of the adhesive).
Figure 7:
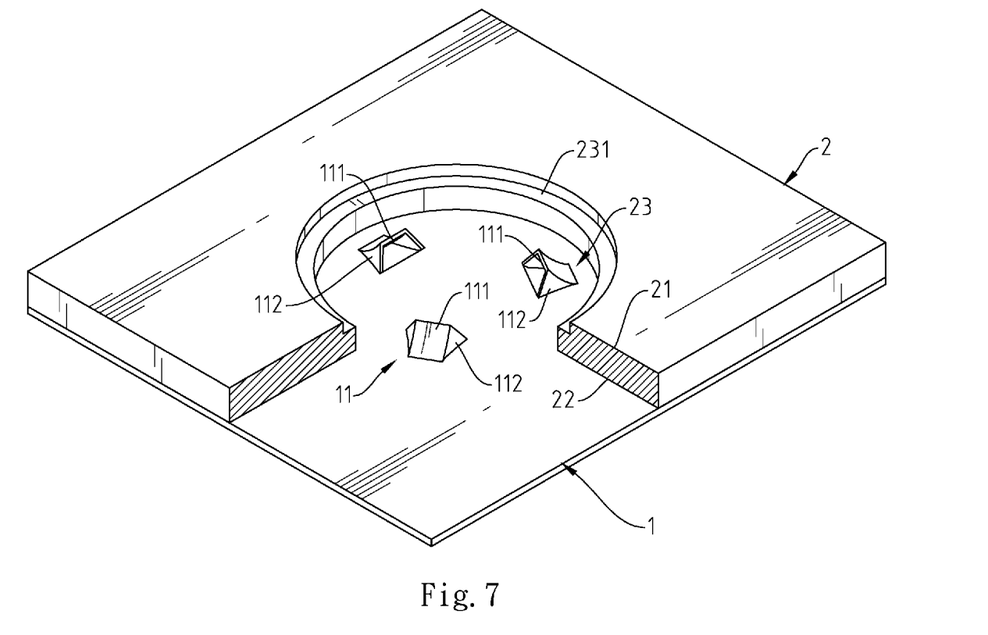
FIG. 7 a cutaway view of a multi-layer plate member bonding structure in accordance with a fifth embodiment of the present invention (before application of the adhesive).
Figure 8:
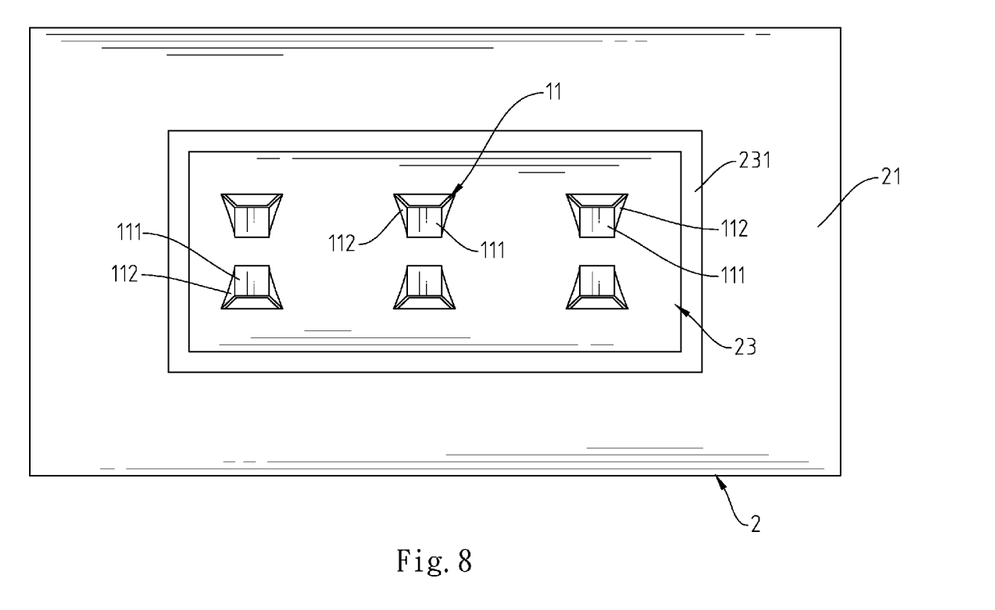
FIG. 8 a top view of a multi-layer plate member bonding structure in accordance with a sixth embodiment of the present invention (before application of the adhesive).
Figure 9:
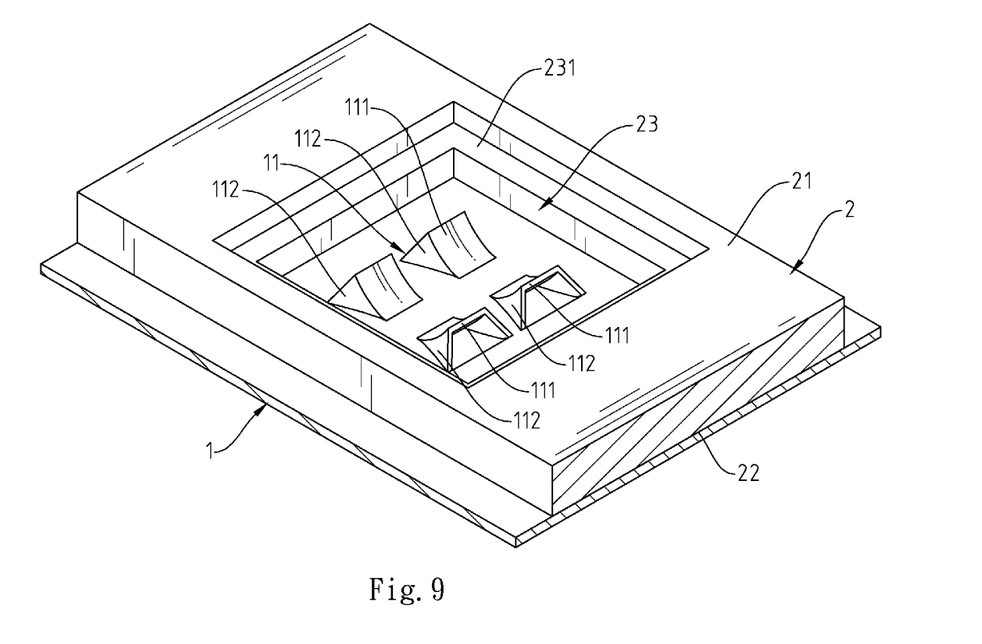
FIG. 9 is an oblique elevation of a multi-layer plate member bonding structure in accordance with a seventh embodiment of the present invention (before application of the adhesive).

Referring to FIG. 5, instead of the aforesaid stepped design, the open chamber 23 can be made having a tapered inner diameter 233 gradually increased in direction from the bonding face 22 toward the outer face 21. When the adhesive 3 is cured, the cured adhesive 3 forms a first stop portion 34 in the tapered inner diameter 233 of the open chamber 23 above the binding unit 11 and a second stop portion 32 in the open chamber 23 between the surface of the first plate member 1 and the binding strips 111 of the binding unit 11, achieving the same effect as that shown in FIGS. 1~3.

Referring to FIGS. 6~9, the binding unit 11 of the first plate member 1 further comprises a plurality of side ribs 112 bilaterally connected between the surface of the first plate member 1 and each binding strip 111 to enhance the anti-deformation ability of the binding unit 11. Further, the binding strips 111 can be arranged in a spiral manner around a circle within the open chamber 23. Alternatively, the binding strips 111 can be arranged in pairs, and the two binding strips of one same pair can be arranged toward each other or in reversed directions. Further, the open chamber 23 can be a circular chamber, square chamber or rectangular chamber.

Figure 10:
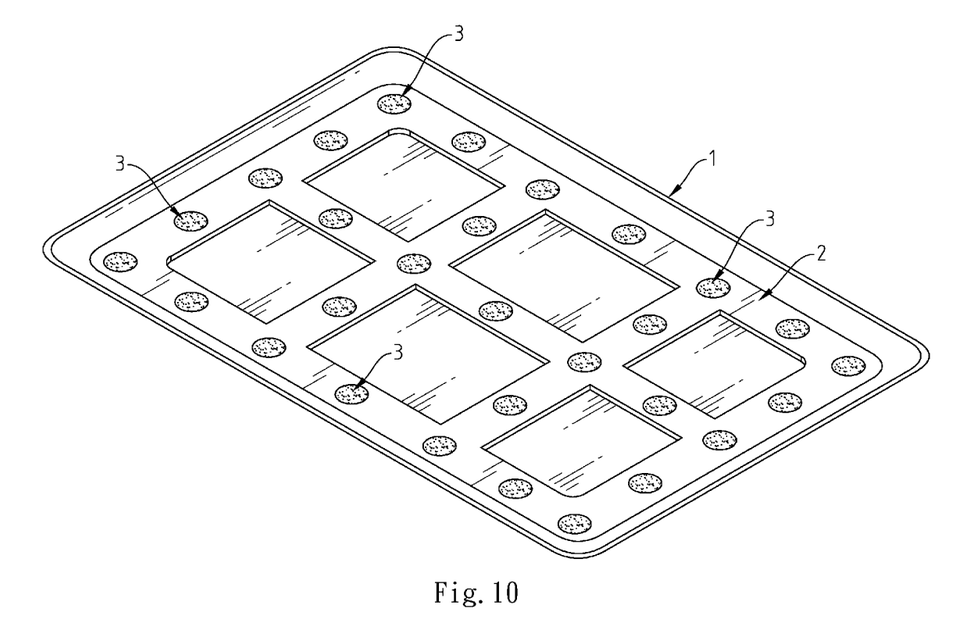
FIG. 10 is an applied view of the present invention.

Referring to FIG. 3 and FIG. 10, the first plate member 1 can be made having multiple binding units 11, and the second plate member 2 can be made having multiple open chambers 23 corresponding to the binding units 11 of the first plate member 1. After the adhesive 3 is cured in each open chamber 23, the first plate member 1 and the second plate member 2 are tightly bonded together. Further, the first plate member 1 and the second plate member 2 can be made of metal or a non-metal material. Further, the adhesive 3 can be applied to the open chambers 23 of the second plate member 2 by means of an injection machine.

As stated above, the invention eliminates the drawbacks of the prior art techniques, subject to the following technical features:

The first plate member 1 is made having at least one binding unit 11 at one side thereof, the second plate member 2 is made having at least one open chamber 23 corresponding to the at least one binding unit 11 of the first plate member 1, and an adhesive 3 is filled in the at least one open chamber 23 and cured to secure the first plate member 1 and the second plate member 2 tightly together. Subject to the characteristic of the annular step 231, tapered upper part 232 or tapered inner diameter 233 of the at least one open chamber 23, the cured adhesive 3 forms a first stop portion 31, 33 or 34 at the upper side in each open chamber 23 above the binding unit 11 to stop the second plate member 2 from an outward displacement in direction away from the first plate member 1.

Further, subject to the characteristic of the annular step 231, tapered upper part 232 or tapered inner diameter 233 of the at least one open chamber 23, the cured adhesive 3 forms a first stop portion 31, 33 or 34 at the upper side in each open chamber 23 above the binding unit 11 and a second stop portion 32 in each open chamber 23 in between the binding strips 111 and the surface of the first plate member 1. Thus, the adhesive 3 can be prepared from any of a variety of materials to fit different manufacturing processes, such as insert molding, filling, thermoplastic extrusion, UV curing, etc.

What the invention claimed is:

1. A multi-layer plate member bonding structure, comprising:
   a first plate member having at least one binding unit coupled to and extending from a top surface thereof;
   a second plate member co-planar with the first plate member, said second plate member comprising an outer face disposed at one side thereof, a bonding face disposed at an opposite side thereof and attached to the top surface of said first plate member, at least one open chamber cut through said outer face and said bonding face corresponding to the at least one binding unit of said first plate member, each said open chamber having a relatively greater upper part connected to said outer face and a relatively smaller lower part connected to said bonding face; and
   an adhesive filled up each said open chamber and cured, said adhesive forming a first stop portion in the relatively greater upper part of each said open chamber and a second stop portion in the relatively smaller lower part in each said open chamber to secure said first plate member and said second plate member firmly together;
   wherein the binding unit does not extend beyond the outer face of the second plate, each binding unit comprises a plurality of binding strips, each binding strip having an end thereof connected to the top surface of said first plate member and an opposite end thereof extending in a direction away from the top surface of said first plate member, and the second stop portion of said adhesive in each open chamber is formed in between the binding strips of the associating binding unit and the top surface of said first plate member.

2. The multi-layer plate member bonding structure of claim 1, wherein said adhesive is a polymer material.

3. The multi-layer plate member bonding structure of claim 1, wherein each binding unit further comprises a plurality of side ribs bilaterally connected between the top surface of said first plate member and each binding strip.

4. The multi-layer plate member bonding structure of claim 1, wherein the binding strips of each said binding unit are equiangularly spaced from one another.

5. The multi-layer plate member bonding structure of claim 1, wherein a top surface of the adhesive is substantially coplanar and level with the outer face of the second plate.

* * * * *